United States Patent
Yang et al.

(10) Patent No.: US 12,172,932 B1
(45) Date of Patent: Dec. 24, 2024

(54) PREPARATION METHOD FOR MICROWAVE DIELECTRIC RESONATOR WITH LAMINATED STRUCTURE

(71) Applicant: Huzhou Ceramic-Chip Electronic Technology Co., Ltd., Huzhou (CN)

(72) Inventors: YuanYuan Yang, Huzhou (CN); XiaoZhen Li, Kunming (CN); MengJiang Xing, Kunming (CN); HongYu Yang, Xi'an (CN); YiFang Zhang, Beijing (CN)

(73) Assignee: Huzhou Ceramic-Chip Electronic Technology Co., Ltd., Huzhou (CN)

( * ) Notice: Subject to any disclaimer, the term of this patent is extended or adjusted under 35 U.S.C. 154(b) by 0 days.

(21) Appl. No.: 18/761,318

(22) Filed: Jul. 2, 2024

(30) Foreign Application Priority Data

Jul. 9, 2023 (CN) .......................... 202310832842.2

(51) Int. Cl.
*C04B 35/495* (2006.01)
*C04B 35/626* (2006.01)
(Continued)

(52) U.S. Cl.
CPC ........ *C04B 35/495* (2013.01); *C04B 35/6262* (2013.01); *C04B 35/62655* (2013.01); *C04B 35/62675* (2013.01); *C04B 35/62695* (2013.01); *C04B 35/63416* (2013.01); *C04B 35/64* (2013.01); *H01P 11/008* (2013.01);
(Continued)

(58) Field of Classification Search
CPC .... C04B 2235/3284; C04B 2235/3232; C04B 2235/3255; C04B 2235/3224; C04B 35/496; C04B 35/453; C04B 35/462; H01P 11/008
See application file for complete search history.

(56) References Cited

U.S. PATENT DOCUMENTS 5,431,955 A * 7/1995 Kawamura ............... C03C 4/16
501/134
6,340,649 B1 * 1/2002 Kawata .................. C04B 35/462
501/138
(Continued)

FOREIGN PATENT DOCUMENTS

| CN | 106986635 A | * | 7/2017 | |
| CN | 108285344 A | * | 7/2018 | |
| CN | 108455986 B | * | 10/2020 | ........... C04B 35/495 |

OTHER PUBLICATIONS

CN-108455986-B (Li) Oct. 23, 2020 (English language translation). [online] [retrieved Sep. 19, 2024]. Retrieved from: Clarivate Analytics. (Year: 2020).*
(Continued)

*Primary Examiner* — Erin Snelting

(57) ABSTRACT

A preparation method for a microwave dielectric resonator with a laminated structure is provided. The laminated structure of the microwave dielectric resonator is a three-layer structure of the top, middle, and bottom layers. A composition expression of the microwave dielectric resonator is $y \cdot ZnTi_{0.95}Sc_{0.05}Nb_2O_8 \text{-} x \cdot TiO_2 \text{-} y \cdot ZnTi_{0.95}Sc_{0.05}Nb_2O_8$, and a range of x is 0.03-0.05 grams, and y is $(1-x)/2$ grams. The microwave dielectric resonator has good temperature stability while maintaining a moderate dielectric constant and a higher quality factor Qf.

8 Claims, 1 Drawing Sheet

(51) Int. Cl.
  *C04B 35/634* (2006.01)
  *C04B 35/64* (2006.01)
  *H01P 11/00* (2006.01)

(52) U.S. Cl.
  CPC ............... *C04B 2235/3224* (2013.01); *C04B 2235/3232* (2013.01); *C04B 2235/3255* (2013.01); *C04B 2235/3284* (2013.01); *C04B 2235/6567* (2013.01)

(56) References Cited

U.S. PATENT DOCUMENTS

| | | | | |
|---|---|---|---|---|
| 2007/0172652 | A1* | 7/2007 | Kawano | H01B 3/12 428/404 |
| 2015/0030830 | A1* | 1/2015 | Adachi | H05K 3/4688 428/212 |
| 2017/0101344 | A1* | 4/2017 | Hirahara | C04B 35/465 |

OTHER PUBLICATIONS

CN-108285344-A (Du) Jul. 17, 2018 (English language translation). [online] [retrieved Sep. 19, 2024]. Retrieved from: Clarivate Analytics. (Year: 2018).*

CN-106986635-A (Li) Jul. 28, 2017 (English language translation). [online] [retrieved Sep. 19, 2024]. Retrieved from: Clarivate Analytics. (Year: 2017).*

\* cited by examiner

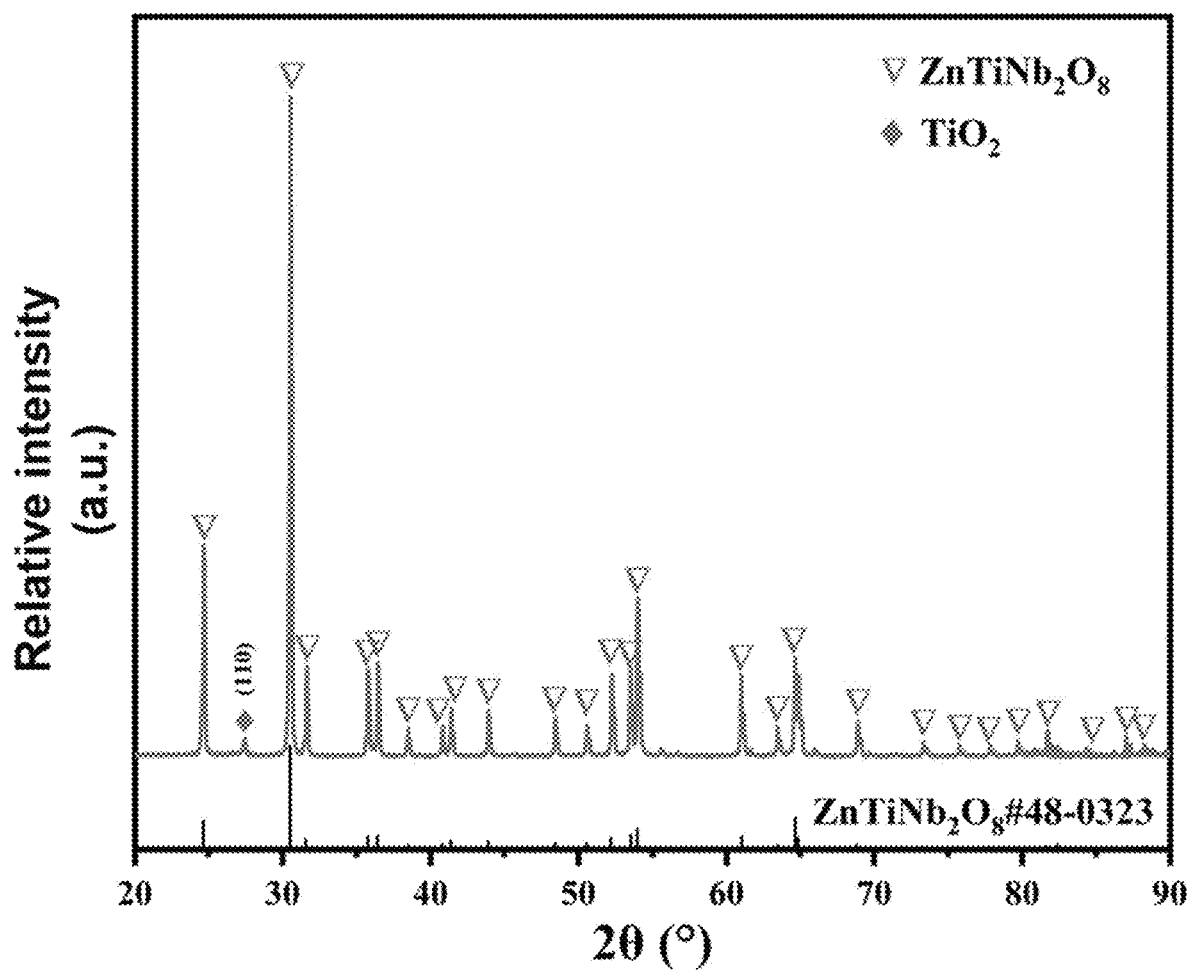

PREPARATION METHOD FOR MICROWAVE DIELECTRIC RESONATOR WITH LAMINATED STRUCTURE

CROSS-REFERENCE TO RELATED APPLICATION

This application claims priority to Chinese patent application No. CN 202310832842.2, filed to China National Intellectual Property Administration (CNIPA) on Jul. 9, 2023, which is herein incorporated by reference in its entirety.

TECHNICAL FIELD

The disclosure relates to the technical field of electronic ceramics, and particularly to a preparation method for a microwave dielectric resonator with a laminated structure.

BACKGROUND

With the development and maturation of fifth-generation mobile communication technology (5G), higher performance requirements have been set for the microwave dielectric resonator. Firstly, a near-zero temperature coefficient of resonant frequency ($\tau_f$) can ensure that a central resonant frequency of the microwave dielectric resonator does not change significantly with the change of an environmental temperature, and can reduce central frequency drift caused by temperature changes and thermal expansion of a casing of the microwave dielectric resonator. Secondly, a moderate dielectric constant can match circuits of different sizes. Lastly, a higher quality factor Qf can meet the low loss requirements of the microwave dielectric resonator, and can enhance frequency selection characteristics thereof.

SUMMARY

Based on the problems, the purpose of the disclosure is to provide a preparation method for a microwave dielectric resonator with a laminated structure. The microwave dielectric resonator with the laminated structure provided by the disclosure has good temperature stability, and possesses a higher quality factor Qf and a moderate dielectric constant.

In order to achieve the above objectives, the disclosure provides the following technical solutions.

A composition expression of a microwave dielectric resonator with a laminated structure is expressed as follows:

$$y\text{-}ZnTi_{0.95}Sc_{0.05}Nb_2O_8\text{-}x\text{-}TiO_2\text{-}y\text{-}ZnTi_{0.95}Sc_{0.05}Nb_2O_8,$$

where a range of x is 0.03-0.05 grams (g), y is (1−x)/2 g.

A preparation method for the microwave dielectric resonator with the laminated structure includes steps as follows.

Step 1: weighing materials consisting of zinc peroxide ($ZnO_2$), titanium dioxide ($TiO_2$), scandium oxide ($Sc_2O_3$) and niobium oxide ($Nb_2O_5$) according to a chemical equation expressed as follows:

$$ZnTi_{0.95}Sc_{0.05}Nb_2O_8,$$

then mixing the materials to obtain a mixture, followed by sequentially ball-milling, drying, crushing, sieving, and then performing first pre-sintering to obtain preliminarily synthesized $ZnTi_{0.95}Sc_{0.05}Nb_2O_8$ dielectric ceramic powder with a mangan-tantalite structure.

Step 2: weighing $TiO_2$ according to the chemical equation expressed as follows:

$$ZnTi_{0.95}Sc_{0.05}Nb_2O_8,$$

followed by sequentially ball-milling, drying, crushing, sieving, and then performing second pre-sintering to obtain preliminarily synthesized $TiO_2$ dielectric ceramic powder with a rutile structure.

Step 3: adding polyvinyl alcohol into the preliminarily synthesized $ZnTi_{0.95}Sc_{0.05}Nb_2O_8$ dielectric ceramic powder with the mangan-tantalite structure obtained from the step 1, followed by sequentially ball-milling, drying, crushing, and sieving to thereby obtain granulated $ZnTi_{0.95}Sc_{0.05}Nb_2O_8$ dielectric ceramic powder; and adding polyvinyl alcohol into the preliminarily synthesized $TiO_2$ dielectric ceramic powder with the rutile structure obtained from the step 2, followed by sequentially ball-milling, drying, crushing, and sieving to thereby obtain granulated $TiO_2$ dielectric ceramic powder.

Step 4: adding the granulated $ZnTi_{0.95}Sc_{0.05}Nb_2O_8$ dielectric ceramic powder and the granulated $TiO_2$ dielectric ceramic powder into a mold, to thereby obtain a ceramic green body with a three-layer structure, wherein a bottom layer of the three-layer structure is filled with the granulated $ZnTi_{0.95}Sc_{0.05}Nb_2O_8$ dielectric ceramic powder, a middle layer of the three-layer structure is filled with the granulated $TiO_2$ dielectric ceramic powder, and a top layer of the three-layer structure is filled with the granulated $ZnTi_{0.95}Sc_{0.05}Nb_2O_8$ dielectric ceramic powder.

Step 5: sintering the ceramic green body with the three-layer structure obtained from step 4 at a temperature in a range of 1100-1140° C. for 4-8 h to obtain the microwave dielectric resonator with the laminated structure.

In an embodiment, the ball-milling in each of the steps 1-2 further includes:
adding zirconia balls and deionized water for the ball-milling; wherein a rotation speed of the ball-milling is 400 revolutions per minute (rpm), and a ball milling time of the ball-milling is 5-8 h; or,
adding zirconia balls and ethanol for the ball-milling; wherein a rotation speed of the ball-milling is 400 rpm, and a ball milling time of the ball-milling is 5-8 h.

In an embodiment, a temperature of the drying in each of the steps 1-2 is 100° C., and a 40-mesh sieve is used for the sieving in each of the steps 1-2.

In an embodiment, a temperature of the first pre-sintering is in a range of 900-950° C., a time of the first pre-sintering is in a range of 4-6 h, a temperature of the second pre-sintering is in a range of 900-950° C., and a time of the second pre-sintering is in a range of 4-6 h.

In an embodiment, a ratio of a mass of the polyvinyl alcohol added into the preliminarily synthesized $ZnTi_{0.95}Sc_{0.05}Nb_2O_8$ dielectric ceramic powder with the mangan-tantalite structure to a mass of the preliminarily synthesized $ZnTi_{0.95}Sc_{0.05}Nb_2O_8$ dielectric ceramic powder with the mangan-tantalite structure is in a range from 0.5% to 2%, and a ratio of a mass of the polyvinyl alcohol added into the preliminarily synthesized $TiO_2$ dielectric ceramic powder with the rutile structure to a mass of the preliminarily synthesized $TiO_2$ dielectric ceramic powder with the rutile structure is in a range from 0.5% to 2%.

In an embodiment, in the step 3, a ball milling time of the ball-milling is in a range of 10-12 h.

In an embodiment, in the step 3, an 80-mesh sieve is used for the sieving.

In an embodiment, a diameter of the ceramic green body with the three-layer structure is 10 millimeters (mm), and a thickness of the ceramic green body with the three-layer structure is 5 mm.

The beneficial effects of the disclosure are as follows.

A preparation method for a microwave dielectric resonator with a laminated structure is provided, a composition expression of the microwave dielectric resonator is expressed as follows:

$$y\text{-}ZnTi_{0.95}Sc_{0.05}Nb_2O_8\text{-}x\text{-}TiO_2\text{-}y\text{-}ZnTi_{0.95}Sc_{0.05}Nb_2O_8,$$

where a range of x is 0.03-0.05 grams (g), y is (1−x)/2 g.

The microwave dielectric resonator with the laminated structure provided by the disclosure has good temperature stability, that is, the temperature coefficient of the resonant frequency is nearly zero, while also having a moderate dielectric constant and a higher quality factor Qf.

BRIEF DESCRIPTION OF DRAWING

FIGURE illustrates X-ray diffraction (XRD) pattern of a microwave dielectric resonator with a composition expression of 0.48 $ZnTi_{0.95}Sc_{0.05}Nb_2O_8$−0.04 $TiO_2$−0.48 $ZnTi_{0.95}Sc_{0.05}Nb_2O_8$ in embodiment 1 of the disclosure.

DETAILED DESCRIPTION OF EMBODIMENTS

In order to better understand the disclosure, the content of the disclosure will be further elucidated in conjunction with embodiments, but the content of the disclosure is not limited to the following embodiments.

Embodiment 1

A preparation method for a microwave dielectric resonator with a laminated structure incudes the following steps.

Step (1): materials of $ZnO_2$, $TiO_2$, $Sc_2O_3$, and $Nb_2O_8$ are weighed to prepare mixed powder according to a chemical equation expressed as follows:

$$ZnTi_{0.95}Sc_{0.05}Nb_2O_8,$$

proportions of the materials are as follows: 1.1443 grams (g) of $ZnO_2$, 1.0768 g of $TiO_2$, 0.0245 g of $Sc_2O_3$, 3.7816 g of $Nb_2O_5$. The mixed powder is placed into a polyethylene jar, and then 200 milliliters (ml) of deionized water and 60 g of zirconia balls are added into the polyethylene jar to obtain a mixture. The mixture is ball-milled for 6 h using a planetary ball mill at a rotation speed of 400 revolutions per minute (rpm) in a unidirectional operation to obtain a slurry. After the ball-milling, the slurry is transferred to a drying oven and dried at 100° C. to obtain a solid, followed by crushing and sieving the solid through a 40-mesh sieve to obtain sieved powder. The sieved powder is placed into a sintering furnace and pre-sintered at 950° C. for 6 hours to obtain preliminarily synthesized $ZnTi_{0.95}Sc_{0.05}Nb_2O_8$ dielectric ceramic powder with a mangan-tantalite structure.

Step (2): 5 g of $TiO_2$ is proceed with the same way as described in step 1, which includes the ball-milling, the drying, the sieving, and the pre-sintering, thereby to obtain preliminarily synthesized $TiO_2$ dielectric ceramic powder with a rutile structure.

Step (3): 1.0 weight percent (wt %) of polyvinyl alcohol are added into the preliminarily synthesized $ZnTi_{0.95}Sc_{0.05}Nb_2O_8$ dielectric ceramic powder with the mangan-tantalite structure obtained from the step 1 and the preliminarily synthesized $TiO_2$ dielectric ceramic powder with the rutile structure obtained from the step 2 to obtain $ZnTi_{0.95}Sc_{0.05}Nb_2O_8$ mixed powder and $TiO_2$ mixed powder, respectively. The $ZnTi_{0.95}Sc_{0.05}Nb_2O_8$ mixed powder and the $TiO_2$ mixed powder are added into ball mill tanks, respectively, then zirconia balls and deionized water are added into the ball mill tanks, followed by sequentially ball-milling for 12 h, drying, crushing, sieving through an 80-mesh sieve to obtain granulated $ZnTi_{0.95}Sc_{0.05}Nb_2O_8$ dielectric ceramic powder and granulated $TiO_2$ dielectric ceramic powder, respectively.

Step (4): the granulated $ZnTi_{0.95}Sc_{0.05}Nb_2O_8$ dielectric ceramic powder and the granulated $TiO_2$ dielectric ceramic powder are added into a mold, to thereby obtain a ceramic green body with a three-layer structure. Specifically, a bottom layer of the three-layer structure is filled with 0.48 g of the granulated $ZnTi_{0.95}Sc_{0.05}Nb_2O_8$ dielectric ceramic powder, a middle layer of the three-layer structure is filled with 0.04 g of the granulated $TiO_2$ dielectric ceramic powder, and a top layer of the three-layer structure is filled with 0.48 g of the granulated $ZnTi_{0.95}Sc_{0.05}Nb_2O_8$ dielectric ceramic powder.

Step (5): the ceramic green body with the three-layer structure obtained from step 4 is sintered at a temperature of 1120° C. for 6 h to obtain the microwave dielectric resonator with the laminated structure.

The microwave dielectric resonator with the laminated structure of 0.48 $ZnTi_{0.95}Sc_{0.05}Nb_2O_8$−0.04 $TiO_2$−0.48 $ZnTi_{0.95}Sc_{0.05}Nb_2O_8$ are characterized by X-ray diffraction (XRD), and it can be seen from FIGURE that, after X-ray powder diffraction analysis, a phase composition of the composite ceramics is a coexistence of mangan-tantalite $ZnTi_{0.95}Sc_{0.05}Nb_2O_8$ and rutile $TiO_2$. No other extraneous diffraction peaks are found, indicating that the laminated composite structure greatly restricts the chemical reaction between $ZnTi_{0.95}Sc_{0.05}Nb_2O_8$ and $TiO_2$ phases, significantly enhancing a temperature compensation efficiency of $TiO_2$.

Embodiment 2

The steps are as same as embodiment 1, the difference lies in the step 4, in the embodiment 2, the pressing of the ceramic green body with laminated composite according to the composition expression of 0.485 $ZnTi_{0.95}Sc_{0.05}Nb_2O_8$−0.03 $TiO_2$−0.485 $ZnTi_{0.95}Sc_{0.05}Nb_2O_8$.

Embodiment 3

The steps are as same as embodiment 1, the difference lies in the step 4, in the embodiment 3, the pressing of the ceramic green body with laminated composite according to the composition expression of 0.475 $ZnTi_{0.95}Sc_{0.05}Nb_2O_8$−0.05 $TiO_2$−0.475 $ZnTi_{0.95}Sc_{0.05}Nb_2O_8$.

Comparative Example 1

The steps are as same as embodiment 1, the difference lies in the step 4, in the comparative example 1, the pressing of the ceramic green body with laminated composite according to the composition expression of 0.495 $ZnTi_{0.95}Sc_{0.05}Nb_2O_8$−0.01 $TiO_2$−0.495 $ZnTi_{0.95}Sc_{0.05}Nb_2O_8$.

Comparative Example 2

The steps are as same as embodiment 1, the difference lies in the step 4, in the comparative example 2, the pressing of the ceramic green body with laminated composite according to the composition expression of 0.49 ZnTi$_{0.95}$Sc$_{0.05}$Nb$_2$O$_8$–0.02 TiO$_2$–0.49 ZnTi$_{0.95}$Sc$_{0.05}$Nb$_2$O$_8$.

The microwave dielectric performance of the microwave dielectric ceramics from the embodiments 1-3 and the comparative examples 1-2 are tested using a network analyzer, and the results are shown in Table 1.

TABLE 1

Microwave dielectric performance of embodiments 1-3 and comparative examples 1-2

| | Sintering | | Microwave dielectric performance | | |
|---|---|---|---|---|---|
| | temperature/° C. | x | dielectric constant ε$_r$ | Qf (GHz) | τ$_f$ (ppm/° C.) |
| Embodiment 1 | 1120 | 0.04 | 42.1 | 51477 | +1.9 |
| Embodiment 2 | 1120 | 0.03 | 38.7 | 53948 | −17.62 |
| Embodiment 3 | 1120 | 0.05 | 42.9 | 48001 | +12.41 |
| Comparative Example 1 | 1120 | 0.01 | 36.9 | 58921 | −46.41 |
| Comparative Example 2 | 1120 | 0.02 | 37.8 | 56314 | −27.94 |

From Table 1, it can be seen that compared to the microwave dielectric ceramics of the comparative examples 1-2, the microwave dielectric ceramics of the embodiments 1-3 of the disclosure have a near-zero temperature coefficient of resonant frequency and also possess a high dielectric constant. In addition, the quality factors Qf of the embodiments 1-3 show only a slight decrease compared to the comparative examples 1-2. Among them, the comprehensive performance of the microwave dielectric ceramic in the embodiment 1 is relatively the best.

The above is only a specific embodiment of the disclosure. It should be pointed out that for those skilled in the art, several improvements and embellishments can be made without departing from the principles of the disclosure, and these improvements and embellishments should also be considered as the scope of protection of the disclosure.

What is claimed is:

1. A preparation method for a microwave dielectric resonator with a laminated structure, wherein a composition expression of the microwave dielectric resonator is as follows:

y·ZnTi$_{0.95}$Sc$_{0.05}$Nb$_2$O$_8$-x·TiO$_2$-y·ZnTi$_{0.95}$Sc$_{0.05}$Nb$_2$O$_8$, where a range of x is 0.03-0.05 grams (g), y is (1−x)/2 g; and wherein the preparation method comprises:
step 1: weighing materials consisting of zinc peroxide (ZnO$_2$), titanium dioxide (TiO$_2$), scandium oxide (Sc$_2$O$_3$) and niobium oxide (Nb$_2$O$_8$) according to a chemical equation expressed as follows:

ZnTi$_{0.95}$Sc$_{0.05}$Nb$_2$O$_8$, 

then mixing the materials to obtain a mixture, followed by sequentially ball-milling, drying, crushing, sieving, and then performing first pre-sintering to obtain preliminarily synthesized ZnTi$_{0.95}$Sc$_{0.05}$Nb$_2$O$_8$ dielectric ceramic powder with a mangan-tantalite structure,
wherein a temperature of the first pre-sintering is in a range of 900-950° C., a time of the first pre-sintering is in a range of 4-6 hours (h);
step 2: weighing TiO$_2$, followed by sequentially ball-milling, drying, crushing, sieving, and then performing second pre-sintering to obtain preliminarily syn- thesized TiO$_2$ dielectric ceramic powder with a rutile structure, wherein a temperature of the second pre-sintering is in a range of 900-950° C., a time of the second pre-sintering is in a range of 4-6 h;
step 3: adding polyvinyl alcohol into the preliminarily synthesized ZnTi$_{0.95}$Sc$_{0.05}$Nb$_2$O$_8$ dielectric ceramic powder with the mangan-tantalite structure obtained from the step 1, followed by sequentially ball-milling, drying, crushing, and sieving to thereby obtain granulated ZnTi$_{0.95}$Sc$_{0.05}$Nb$_2$O$_8$ dielectric ceramic powder; and adding polyvinyl alcohol into the preliminarily synthesized TiO$_2$ dielectric ceramic powder with the rutile structure obtained from the step 2, followed by sequentially ball-milling, drying, crushing, and sieving to thereby obtain granulated TiO$_2$ dielectric ceramic powder;
step 4: adding the granulated ZnTi$_{0.95}$Sc$_{0.05}$Nb$_2$O$_8$ dielectric ceramic powder and the granulated TiO$_2$ dielectric ceramic powder into a mold, to thereby obtain a ceramic green body with a three-layer structure, wherein a bottom layer of the three-layer structure is filled with the granulated ZnTi$_{0.95}$Sc$_{0.05}$Nb$_2$O$_8$ dielectric ceramic powder, a middle layer of the three-layer structure is filled with the granulated TiO$_2$ dielectric ceramic powder, and a top layer of the three-layer structure is filled with the granulated ZnTi$_{0.95}$Sc$_{0.05}$Nb$_2$O$_8$ dielectric ceramic powder; and
step 5: sintering the ceramic green body with the three-layer structure obtained from step 4 at a temperature in a range of 1100-1140° C. for 4-8 h to obtain the microwave dielectric resonator with the laminated structure.

2. The preparation method for the microwave dielectric resonator with the laminated structure as claimed in claim 1, wherein in the composition expression, x is one of 0.03 g, 0.04 g, or 0.05 g, and y is (1−x)/2 g.

3. The preparation method for the microwave dielectric resonator with the laminated structure as claimed in claim 1, wherein the ball-milling in each of the steps 1-2 further comprises:
adding zirconia balls and deionized water for the ball-milling; wherein a rotation speed of the ball-milling is 400 revolutions per minute (rpm), and a ball milling time of the ball-milling is 5-8 h; or,
adding zirconia balls and ethanol for the ball-milling; wherein a rotation speed of the ball-milling is 400 rpm, and a ball milling time of the ball-milling is 5-8 h.

4. The preparation method for the microwave dielectric resonator with the laminated structure as claimed in claim 1, wherein a temperature of the drying in each of the steps 1-2 is 100° C., and a 40-mesh sieve is used for the sieving in each of the steps 1-2.

5. The preparation method for the microwave dielectric resonator with the laminated structure as claimed in claim 1, wherein in the step 3, a ratio of a mass of the polyvinyl alcohol added into the preliminarily synthesized ZnTi$_{0.95}$Sc$_{0.05}$Nb$_2$O$_8$ dielectric ceramic powder with the mangan-tantalite structure to a mass of the preliminarily synthesized ZnTi$_{0.95}$Sc$_{0.05}$Nb$_2$O$_8$ dielectric ceramic powder with the mangan-tantalite structure is in a range from 0.5% to 2%, and a ratio of a mass of the polyvinyl alcohol added into the preliminarily synthesized TiO$_2$ dielectric ceramic powder with the rutile structure to a mass of the preliminarily synthesized TiO$_2$ dielectric ceramic powder with the rutile structure is in a range from 0.5% to 2%.

6. The preparation method for the microwave dielectric resonator with the laminated structure as claimed in claim 1, wherein in the step 3, a ball milling time of the ball-milling is in a range of 10-12 h.

7. The preparation method for the microwave dielectric resonator with the laminated structure as claimed in claim 1, wherein in the step 3, an 80-mesh sieve is used for the sieving.

8. The preparation method for the microwave dielectric resonator with the laminated structure as claimed in claim 1, wherein a diameter of the ceramic green body with the three-layer structure is 10 millimeters (mm), and a thickness of the ceramic green body with the three-layer structure is 5 mm.

* * * * *